UNITED STATES PATENT OFFICE.

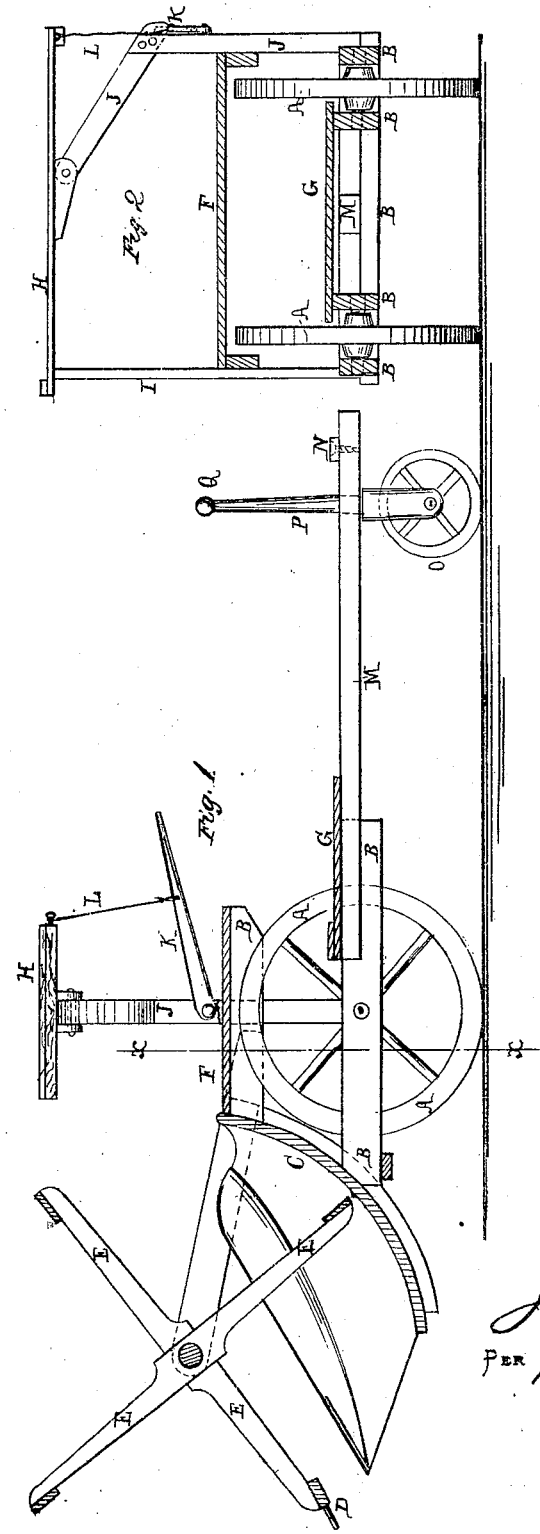

J. B. McCORMIK, OF DAYTON, OHIO.

IMPROVEMENT IN HARVESTERS.

Specification forming part of Letters Patent No. 99,929, dated February 15, 1870.

*To all whom it may concern:*

Be it known that I, J. B. McCORMIK, of Dayton, in the county of Montgomery and State of Ohio, have invented a new and useful Improvement in Harvesters; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved harvester. Fig. 2 is a vertical cross-section of the same, taken through the line *x x*, Fig. 1.

Similar letters of reference indicate corresponding parts.

My invention has for its object to improve the construction of that class of harvesters in which the binders ride upon the machine, so as to make them of lighter draft and more convenient in use; and it consists in the construction and combination of various parts of the machine, as hereinafter more fully described.

A are the drive-wheels. B is the frame. C is the curved platform, placed in the rear of the cutter-bar, and up which the grain is swept by the rake D, one or more of which are attached to the arms of the reel E. F is a platform or table, placed in the rear of the upper edge of the curved platform C, and which receives the grain as it is swept up the said curved platform by the rake or rakes D, attached to the reel E. G is the platform upon which the binders stand while taking the grain from the platform F and binding it. The platform G extends across the machine at the rear of the platform F, and is so much lower than the said platform F that the binders may work conveniently. H is a platform, placed at such a distance above the platform F as not to interfere with the passage of the grain to said platform F, or with the binders when at work.

The platform H is supported at one end by a support, I, attached to the frame B. The platform H is pivoted between its middle point and its other end to the upper end of the support J, the lower end of which is attached to the frame B.

The upper part of the support J is made inclined, as shown in Fig. 2, so as, while allowing the said platform H to be tilted sufficiently to allow the bundles of grain to slide from it freely, it may, at the same time, be firmly supported while in said inclined position.

K is a lever, one end of which is pivoted to the support J, or to some suitable part of the frame B, and its other end extends back into such a position that it may be conveniently reached and operated by one of the binders from the platform G.

The lever K is connected with the unsupported end of the platform H by a rod, cord, or chain, L, so that the said platform H may be tilted to discharge the bundles of grain by operating the lever K.

By this arrangement, as the grain is bound the bundles are placed upon the platform H until a sufficient number of bundles has been placed upon it to form a shock. The platform is then tilted to discharge the said bundles in a heap to be shocked.

M is the tongue, the forward end of which is attached to the center of the rear part of the frame B, and to the rear end of which the double-tree N is pivoted, so that the power may be placed directly in the rear of the machine, entirely doing away with the side draft.

The rear or free end of the tongue M is supported by a caster-wheel, O, the standard P of which passes up through the rear end of said tongue, and has a cross-bar or lever, Q, attached to its upper end, so that the machine may be guided by means of the said casterwheel.

Having thus described my invention, I claim as new and desire to secure by Letters Patent—

1. The arrangement of the binders' platform G, receiving-table F, and tilting platform H, with respect to each other, as and for the purpose specified.

2. The tilting platform H, pivoted as described, the inclined support J, lever K, and strap L, all constructed and arranged as set forth, to form a bundle-receptacle, which may be operated by the binders in the manner described.

J. B. McCORMIK.

Witnesses:
 JAMES C. YOUNG,
 THOS. D. MITCHELL,
 S. E. SHRIVER.